United States Patent [19]
Beil

[11] 3,739,328
[45] June 12, 1973

[54] ACOUSTIC IMPEDANCE LOGGING USING REFLECTION COEFFICIENTS

[75] Inventor: Ralph G. Beil, Houston, Tex.

[73] Assignee: Schlumberger Technology Corporation, New York, N.Y.

[22] Filed: July 13, 1970

[21] Appl. No.: 54,419

[52] U.S. Cl. .................... 340/15.5 AC, 181/.5 BE
[51] Int. Cl. ................................................ G01v 1/28
[58] Field of Search .............................. 181/.5 BE; 340/15.5 MR, 15.5 CM, 15.5 AC

[56] References Cited
UNITED STATES PATENTS

| | | | |
|---|---|---|---|
| 3,292,143 | 12/1966 | Russell | 181/.5 |
| 3,311,876 | 3/1967 | Lee | 181/.5 |
| 3,136,381 | 6/1964 | Anderson | 181/.5 |

Primary Examiner—Benjamin A. Borchelt
Assistant Examiner—J. V. Doramus
Attorney—Ernest R. Archambeau, Jr., Stewart F. Moore, David L. Moseley, Edward M. Roney, William R. Sherman, Jerry M. Presson, Michael J. Berger and James C. Kesterson

[57] ABSTRACT

An illustrative embodiment of the present invention includes methods and apparatus for making measurements of the acoustic impedance of earth formations surrounding a well borehole. The acoustic reflection coefficient in the frequency region above 5 KHZ is measured and used in analog computer apparatus in conjunction with the known borehole mud impedance to determine the acoustic impedance of formations surrounding the borehole from a predetermined expression. The process is repetitively performed at different borehole depths to give a log of this quantity.

16 Claims, 6 Drawing Figures

Patented June 12, 1973

Ralph G. Beil
INVENTOR

BY William J. Beard
ATTORNEY

Patented June 12, 1973

Ralph G. Beil
INVENTOR

BY William J. Beard

ATTORNEY

ACOUSTIC IMPEDANCE LOGGING USING REFLECTION COEFFICIENTS

BACKGROUND OF THE INVENTION

This invention relates to acoustic well logging and more specifically to methods and systems for determining the acoustic impedance of earth formations surrounding a borehole.

It has become common practice in modern oil exploration and well surveying techniques to employ the acoustic travel time log of subsurface earth formations. This log has been particularly valuable in the well logging art in order to determine the acoustic travel time which in turn may be related to the porosity of subsurface earth formations. Information pertaining to the porosity of subsurface formations is, of course, very valuable since it is indicative of the pore space in the formations and hence of the amount of hydrocarbon it would be possible for the formations to contain.

It has also been proposed in the prior art to measure the acoustic impedance of earth formations using a plurality of techniques. For example, the technique disclosed in U.S. Pat. No. 2,868,311 shows a method for measuring the acoustic impedance in which a ratio is established between the voltage induced in a transducer due to longitudinal standing acoustic waves and the voltage due to radial acoustic waves. Similarly, U.S. Pat. No. 2,998,091 discloses acoustic methods for measuring earth formation impedances utilizing low frequency techniques.

The acoustic impedance of a formation may be defined as:

$$Z_f = \rho v \qquad (1)$$

where $Z_f$ represents the acoustic impedance of the earth formation having density $\rho$. Here $v$ is the acoustic compressional wave velocity in the formation. It will thus be appreciated by those skilled in the art that if the travel time of compressional waves in the earth formation $v$ is independently measured in a conventional manner as known in the art, that this measurement may be combined with an acoustic impedance measurement such as that of the present invention to derive an accurate measure of the formation density $\rho$ which in turn may be directly related to the porosity of the formation.

The present invention achieves an accurate measurement of the acoustic impedance of earth formations surrounding the borehole in a novel manner. This includes methods and apparatus for determining the acoustic reflection coefficients of radially propagated acoustic waves in the borehole mud resulting from their reflection by the surrounding earth formations. It may, for example, be shown that this reflection coefficient at frequencies above a minimum lower cutoff frequency of approximately 5 KHZ may be related to the acoustic impedance of the formations in a particularly usable manner.

Accordingly, it is an object of the present invention to provide a novel method and apparatus for determining the acoustic impedance of earth formations surrounding a well bore.

Another object of the present invention is to provide a system for determining the acoustic impedance of earth formations surrounding a well bore by determining the acoustic reflection coefficient at the borehole-formation interface and relating this to the acoustic impedance of the earth formations.

Yet another object of the present invention is to investigate the radial acoustic energy transfer from the borehole into the surrounding earth formations and through such an investigation, which may use conventional downhole acoustic well logging apparatus if desired, to determine the acoustic impedance of earth formations surrounding the borehole.

In accordance with the objects of the present invention methods and apparatus for determining the acoustic impedance of earth formations surrounding a well borehole are provided. A well logging tool having at least one acoustic transmitter and one or more acoustic receivers is used to traverse the borehole in the vicinity of the earth formations to be investigated. The acoustic transmitter is repetitively activated emitting acoustic energy radially and axially into the earth formations. The acoustic receiver or receivers are repetitively actuated to receive a reflected portion of the transmitted energy which in turn is processed by novel means to determine the acoustic reflection coefficient associated with the radial transfer of energy from the borehole into the surrounding formations. A signal representative of this reflection coefficient is thus generated. The reflection coefficient signal is, in turn, utilized in a computer apparatus to calculate the acoustic impedance of the earth formations from a predetermined relationship. The acoustic impedance signal may be recorded as a function of borehole depth as desired.

The novel features of the present invention are set forth with particularity in the appended claims. The operation together with further objects and advantages of the invention may be best understood by way of illustration and the example of an embodiment when taken in conjunction with the accompanying drawings in which:

DESCRIPTION OF THE PREFERRED EMBODIMENT

In the Applicant's copending patent application entitled, "Cement Evaluation Logging Utilizing Reflection Coefficient", Ser. No. 840,335, filed July 9, 1969, there are described methods and apparatus for cement evaluation logging which are based on the concept of examining certain parameters associated with the characteristic frequencies or radial modes or resonances of the well bore casing annulus formation system. In the present invention a similar concept for analysis is utilized to the extent of a three layer system comprising the sonde, the well bore and the formations. The methods and apparatus of the present invention are directed to determining the acoustic impedance of earth formations surrounding a borehole by determining what may be referred to as the acoustic reflection coefficient in the frequency region above 5 KHZ. Apparatus is disclosed for acoustically exciting the three layer sonde-well bore-formation system together with apparatus for detecting a portion of the radially reflected component of acoustic energy. From this reflected component the acoustic reflection coefficient is determined and used to compute the acoustic impedance of earth formations surrounding the borehole.

Figure 1:
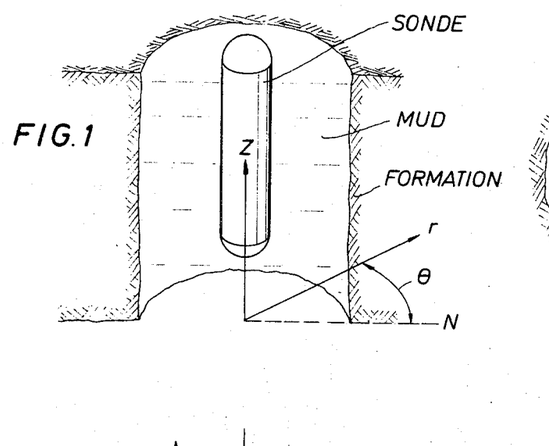
FIG. 1 is a schematic three-dimensional view illustrating the cylindrical geometry of the sonde-well bore-formation system.

Using the cylindrical coordinate system illustrated in FIG. 1 having cylindrical coordinates $r$, $\theta$ and $z$, the displacement of particles in the various media in the system when excited by acoustic energy can be denoted by the functions $U_r$, $U_\theta$ and $U_z$. Considering the case of cylindrical symmetry in which the motion is uniform in all $\theta$ and the $z$ dependance may be ignored (as discussed in a copending patent application entitled, "Cement Evaluation Logging", by J. H. Moran et al., Ser. No. 840,290, filed July 9, 1969, this is valid near the characteristic frequencies or modes of the system) and only the $r$ dependent motion need be considered. This type of motion can be written in terms of a scalar potential function $\phi$ which is defined by:

$$U_r = \delta\phi/\delta r \tag{2}$$

The wave equation for the r dependent motion is then given by:

$$\frac{1}{c^2}\frac{\delta^2\phi}{\delta t^2} = \frac{\delta^2\phi}{\delta r^2} + \frac{1}{r}\frac{\delta\phi}{\delta r} \tag{3}$$

where $c$ is the speed of compressional waves in the system. This equation is derived from well-known physical principles and may, for example, be found by reference to *Elastic Waves in Layered Media* by Ewing, Jardesky and Press, published by the McGraw Hill Company of New York, 1957 Edition.

The scalar potential function $\phi$ is, of course, time dependent as well as dependent on $r$, i.e., $\phi = \phi(r,t)$. However, the time dependence may be taken to be that of a travelling wave [i.e., $\phi(r,t) = F(r) \cdot e^{i\omega t}$] where $\omega = 2\pi f$ is the angular frequency of the wave motion of frequency $f$. Using this relation Equation (3) can be brought into the form:

$$-\frac{\omega^2}{c^2}F = \frac{\delta^2 F}{\delta r^2} + \frac{1}{r}\frac{\delta F}{\delta r} \tag{4}$$

Equation (4) is recognized as a form of Bessels Equation, having a general solution which may be written in the form:

$$F(r) = A\,H_0^{(1)}(Kr) + B\,H_0^{(2)}(Krr) \tag{5}$$

Here $k = \omega/c$ is the wave number of the $r$ waves. $H_o^{(1)}(Kr/c$ and $H_o^{(2)}(kr)$ are called Hankel functions of the first and second kind zero order. The complex number coefficients A and B may be thought of as the complex amplitudes of incoming and outgoing waves respectively, the A's representing the amplitude of incoming waves and the B's representing the amplitude of outgoing waves.

Recalling the definition of the displacement $U_r$ in terms of the potential function $\phi$ (the time dependent expotential function being dropped since it is merely a phase factor which does not influence the amplitude of the $r$ waves) the displacement may be written:

$$U_r = \delta\phi/\delta r = kA\,H_1^{(1)}(kr) - kB\,H_1^{(2)}(kr) \tag{6}$$

where $H_1^{(1)}(kr)$ and $H_1^{(2)}(kr)$ are Hankel functions of the first and second kind first order and again $k = \omega/c$ is the wave number. The radial stress (which is equal to the pressure in a medium if the medium is a fluid) may also be written in terms of the solution of Equation (3). This stress is defined as:

$$\tau_r = (\lambda + 2\mu)\frac{\delta^2\phi}{\delta r^2} + \frac{\lambda}{r}\frac{\delta\phi}{\delta r} \tag{7}$$

where $\lambda$ and $\mu$ are the Lame' constants which define the elastic properties of an isotropic solid. These are related to the compressional $c_d$, and shear $c_t$, wave velocities in a solid by the relationship:

$$c_d = \sqrt{(\lambda + 2\mu)/\rho} \tag{8}$$
$$c_t = \sqrt{\mu/\rho} \tag{9}$$

where $\rho$ is the density of the material. Using the relationships of Equations (8) and (9) the stress function $\tau_r$ may be rewritten as:

$$\tau_r = A\left[\frac{k}{r}2\mu H_1^{(1)}(kr) - k^2(\lambda+2\mu)H_0^{(1)}(kr)\right]$$
$$+ B\left[\frac{k}{r}2\mu H_1^{(2)}(kr) - k^2(\lambda+2\mu)H_0^{(2)}(kr)\right] \tag{10}$$

The general solution Equation (5) above is valid in each of the several layers. This solution can be adapted to the case of a particular problem of interest by applying the boundary conditions of the problem at hand to determine the complex coefficients A and B.

Figure 2:
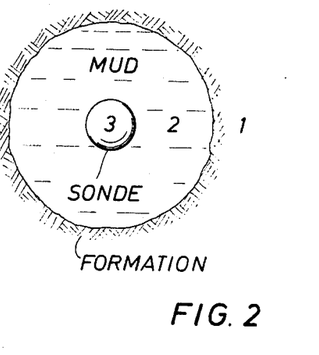
FIG. 2 is a schematic cross-sectional view illustrating the three layers of the sonde well bore formation system.

First, (referring to FIG. 2) there are three layers numbered 1–3 involved in the open hole formation impedance problem. While the general solution above is valid in each layer, the coefficients A and B will be different in each layer. These may be referred to as $A_n$ and $B_n$ for their respective layers. In general, if $n$ is the number of layers there will be $2n$ coefficients to determine by applying the boundary conditions. Two boundary conditions which may be applied are:

1. the displacement $U_r$ is continuous at the boundaries between each of the layers i.e., $U_{r1} = U_{r2}$, $U_{r2} = U_{r3}$; and 2. the normal stress $\tau_r$ is continuous at the boundaries between each of the layers i.e., $\tau_{r1} = \tau_{r2}$, $\tau_{r2} = \tau_{r3}$.

Since there are $n-1$ boundaries between n layers of material these two boundary conditions will furnish $2(n-1) = 2n - 2$ equations in the $2n$ unknown coefficients $A_n$ and $B_n$. Hence, two further boundary conditions must be imposed on the system to obtain a complete solution. These are supplied in the following manner.

In the outer layer (the formation) there is no further outer boundary to reflect waves, hence, the coefficient $A_1$ for the outer layer must be zero (i.e., since the A's may be thought of as the amplitudes of incoming waves). Also, inside the sonde layer 3, it is impossible to distinguish incoming from outgoing waves at the origin of the coordinate system. This is the case since as the waves pass through the origin they change from incoming waves to outgoing waves. This means that $A_3$ must equal $B_3$. These two extra boundary conditions together with those previously stated complete the needed $2n$ equations which may be solved for the $2n$ unknown complex coefficients A and B.

With these boundary conditions the $2n$ simultaneous equations for the coefficients $A_n$ and $B_n$ can be solved and various properties of the system which may be of interest can be observed. For example, one quantity, the ratio $A_2/B_2$ has been found to be of particular interest in determining the acoustic impedance of the formations surrounding the borehole. This quantity represents the ratio of the amplitudes of the incoming to outgoing waves in the mud inside the well bore. Such a quantity is accessible to measurement and may be thought of as a reflection coefficient which indicates how much acoustic energy escapes in a radial direction from the borehole into formations surrounding the borehole.

Figure 4:
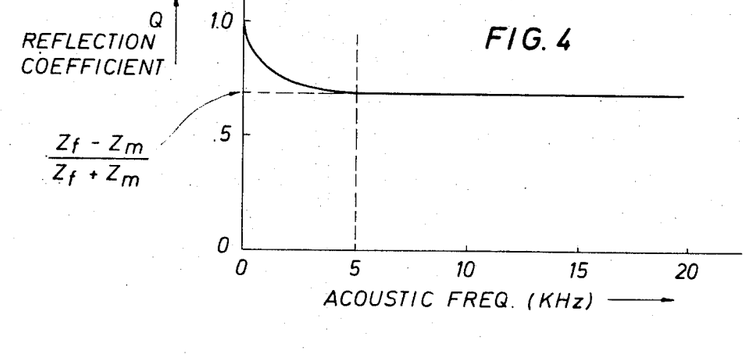
FIG. 4 is a graphical illustration showing the reflection coefficient Q as a function of frequency in the three layer system under discussion.

FIG. 4 shows a representative reflection coefficient curve in which the absolute value of the reflection coefficient $Q = |A_2/B_2|$ is plotted as a function of frequency.

It can be seen that above approximately 5 KHZ the value of $Q$ approaches a constant asymptotic limit which is related to the borehole impedance, $Z_m$, and the formation impedance, $Z_f$, by the expression:

$$Q = (Z_f - Z_m)/Z_f + Z_m) \tag{11}$$

This relation can be rigorously derived from the application of the above mentioned boundary conditions to expressions for the radial displacement and stress as given in Equations (6) and (10) and taking the appropriate high frequency limits of the resulting functions. A more intuitive argument for the validity of Equation (11) results from a consideration of the plane boundary configuration shown schematically in FIG. 3.

Figure 3:
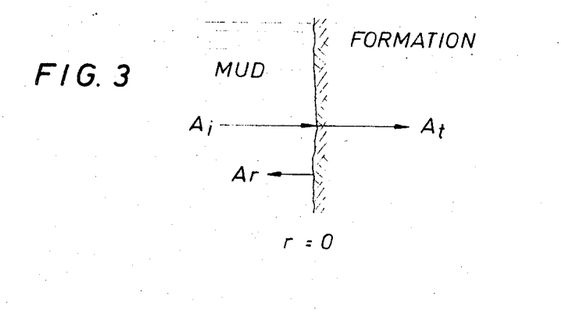
FIG. 3 is a schematic illustration showing the interaction of acoustic waves at a boundary between two media having different acoustic impedances such as the drilling mud and surrounding earth formations.

In this case the amplitude of the incident wave is represented by $A_i$, the amplitude of the transmitted wave in the formation is represented by $A_t$ and the amplitude of the waves reflected from the surface of the formations surrounding the borehole is represented $A_r$. In the case of the plane waves, the form of the incident waves $f_i$ may be represented as:

$$f_i = A_i e^{i(\omega t - k_1 r)} \tag{12}$$

the reflected waves $f_r$ will have the form:

$$f_r = A_r e^{i(\omega t - k_1 r)} \tag{13}$$

and finally, the transmitted wave $f_t$ may be written as:

$$f_t = A_t e^{i(\omega t - k_2 r)} \tag{14}$$

where in the above expressions $k_1 = \omega/c_{mud}$, $\omega = 2\pi f$ and $c_{mud}$ is the velocity of compressional wave propagation in the mud. Here, $k_2 = \omega c_{form}$, $\omega = 2\pi f$ and $c_{form}$ is the speed of propagation of compressional waves in the formation. These approximations make the fundamental assumption that a harmonic wave of a given frequency $f$ will retain this frequency no matter through what medium it travels. This ignores such matters as the possible motion of the acoustic source or receiver which would be considered under the Doppler effect.

Applying the displacement and stress boundary conditions discussed previously and manipulating algebraically the resultant expressions, it is found that the equations for the amplitudes of the reflected and transmitted waves are given in this approximation by the following expressions:

$$A_r = [(1 - \rho_2 c_2 / \rho_1 c_1)/(1 + \rho_2 c_2 / \rho_1 c_1)] \cdot A_i \tag{15}$$
$$[(2)/(1 + \rho_2 c_2 / \rho_1 c_1)] \cdot A_i \tag{16}$$

where $\rho_1$ and $\rho_2$ are respectively the density of the mud and the density of the surrounding formations and $c_1$ and $c_2$ are respectively the mud and formation compressional wave velocities.

Recalling from Equation (1) that the acoustic impedance Z of the medium is defined by the product of its density times the compressional wave velocity in this medium, Equations (15) and (16) may be brought to a more convenient form. In particular, Equation (15) may be brought to the following form:

$$Q = A_r A_i = (Z_f - Z_m)/Z_f + Z_m) \tag{17}$$

where Q is the reflection coefficient which is identical with Equation (11). As previously stated the reflection coefficient Q may be interpreted as the ratio of incoming to outgoing wave amplitudes. $Z_f$ and $Z_m$ are, respectively, the formation acoustic impedance and the mud acoustic impedance. Rearranging terms in equation (17) produces the following equation:

$$Z_f = [Z_m(1+Q)/1-Q] \tag{17a}$$

The expression of Equation (17) derived from the plane wave approximation is particularly valid at acoustic frequencies above 5 KHZ. In this region the acoustic wavelength becomes small with respect to the dimensions of the borehole and the plane wave approximations made in the derivation of Equation (17) are more nearly valid. The portion of the curve of FIG. 4 to the left of the 5 KHZ frequency are the result of a more exact solution obtained in the manner previously discussed wherein the boundary conditions are applied to the more complicated expressions involving the Hankel functions. In this frequency region the plane wave approximation does not give the accuracy as above due to the fact that the wavelengths in question are not negligible with respect to the dimensions of the borehole. It should be noted that if the acoustic reflection coefficient Q is measured in the frequency region above 5 KHZ and the acoustic impedance $Z_m$ of the mud is known, then the formation acoustic impedance may be derived from the expression given by Equation (17).

The following analysis indicates how the reflection coefficient can be measured with tools of conventional design using axially spaced transmitter and receivers. In logging a well bore with acoustic logging tools of conventional design it may not be possible in the strictest sense to measure the reflection coefficient directly. This may be accomplished, however, with a logging tool designed for that purpose such as that disclosed in a copending patent application entitled, "Acoustic Reflection Coefficient Logging", by John D. Ingram, Ser. No. 840,179, filed July 9, 1969, now U.S. Pat. No. 3,697,937 issued Oct. 10, 1972 which is assigned to the assignee of the present invention. This tool utilizes transducers which are placed at essentially the same depth in the borehole for more direct measurement of radial acoustic properties.

Recalling Equation (10) the function $\tau_r$ (pressure) may be rewritten in terms of the reflection coefficient Q as:

$$\tau_r = (a Q + b/c Q + d) \tag{18}$$

where $a$, $b$, $c$ and $d$ are complex expressions involving the Hankel functions. In Equation (18) the term $cQ$ is generally much smaller in magnitude then the complex function $d$. Since this is the case, the function $\tau_r$ may be said to be approximately a linear function of Q (i.e., $\tau_r$ is directly proportional to Q in the approximation). Thus, the expression of Equation (18) may be brought to the more convenient form given by:

$$\tau_r = a' \, Q + b' \qquad (19)$$

In this form the coefficients a' and b' may be thought of as calibration coefficients for an acoustic logging tool which measures the pressure in the mud due to reflected acoustical waves. Thus, by measuring $\tau_r$ the acoustic reflection coefficient Q may be measured with a conventional logging tool such as that shown in FIG. 5.

In practice, the quantity that is measured is the integral corresponding to the area under a rectified received waveform over a comparatively long time interval in that waveform (several wavelengths at least). This integral is effectively the summation of the stress $\tau_r$ at the various component frequencies of the acoustic signal. The integration tends to average out spurious phase effects caused by details of the borehole geometry. Since the integration is actually a summation of many stress components which have a linear dependance on Q, as given in Equation (19), the resulting integral, I, also has a linear dependence on Q given by:

$$I = a'' \, Q + b'' \qquad (20)$$

An analysis similar to the above applies also to the displacement $u_r$, and the acoustic particle velocity. Thus, the scope of the present invention is understood to include tools utilizing receiving transducers which are sensitive to acoustic displacement or velocity as well as acoustic pressure or stress.

It will, of course, be appreciated by those skilled in the art that direct logging of the reflection coefficients themselves could be performed with a logging tool such as that disclosed in the above mentioned copending Ingram patent application yielding a similar result without making the mathematical approximations just discussed.

Figure 5:
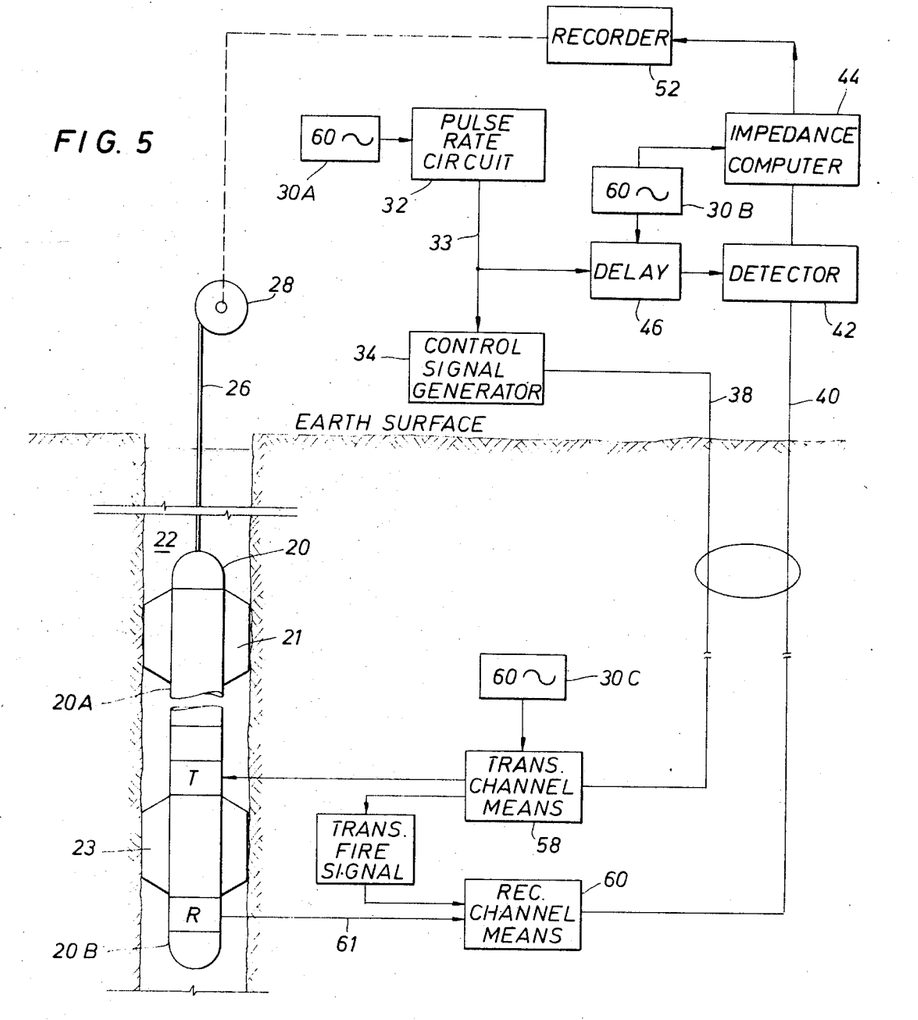
FIG. 5 is an overall block diagram showing an acoustic well logging system for performing the methods of the present invention.

It has been found that the present invention may be practiced with conventional acoustic logging tools such as that shown in FIG. 5 due to the fact that considerable acoustic energy is propagated axially along the borehole. Further, this energy impinging on a receiver at an axial distance of a few feet from the acoustic transmitter is also proportional to the radial reflection coefficient described above. The actual relation is similar in form to Equation (10), but is of considerably greater complexity and involves integrals over the wave numbers of conical waves propagated in the borehole. Due to the extreme mathematical difficulty of a more detailed analysis of this problem, this point will not be pursued further. Experimental results have shown the correctness of this assumption of approximate proportionality between the reflection coefficient and the acoustic pressure at a receiver located a moderate axial distance from the transmitter. Even though in the above analysis only radially propagated acoustic energy is considered, in practice enough energy is propagated axially along the borehole so as to enable the principles of the present invention to be applied with conventional axially spaced transmitter and receiver acoustic logging tools such as that shown in FIG. 6. For purposes of brevity, the practice of the methods of the present invention will be discussed with respect to a single transmitter and receiver acoustic logging tool. It will be understood that the practice of the present invention is not limited to the use of such a tool and logging tools using multiple axially spaced transmitter-receiver pairs could be used if desired.

Referring now to FIG. 5, the overall organization of a well logging system utilizing the principles of the present invention is shown in block diagram form. An elongated logging tool 20 is suspended in a fluid-filled borehole 22. Logging tool 20 is provided with the usual centralizers 21 and 23 at its upper and lower ends respectively for maintaining the tool centered as effectively as possible in the borehole 22.

The tool 20 is suspended in the well bore by means of an armored cable 26 extending from the upper end of the tool to the surface of the earth. The cable is spooled on a winch 28 (shown schematically) as well-known in the art, the operation of which serves to raise and lower the tool through the well bore. The cable 26 may contain a plurality of conductors for providing paths for electrical signals between the surface equipment and the downhole apparatus as well as to supply electrical power from a source on the earth's surface to the downhole equipment.

The tool 20 itself is divided into two portions. An upper portion 20a houses the electronic equipment carried by the tool while a lower portion 20b serves as a support for the acoustic transmitter and receiver. Although not illustrated in the drawing of FIG. 5, it will be appreciated by those skilled in the art that the portion 20b of the tool housing can be so constructed that direct transmission of acoustic energy therethrough from the transmitter T to the receiver R is either suppressed to a negligible level or delayed with respect to the travel time of acoustic waves through the surrounding formations so as not to interfere with the measurements. Various types of housing constructions such as of open work design are known in the art for this purpose.

The surface equipment of the system is shown generally in block form above the dotted line of FIG. 5. The master reference frequency for the overall operation of the logging system is provided by a 60 cycle per second power source which may be obtained from commercial power lines where available or from separate generators. Preferably, power is conducted from its source to the surface equipment and by suitable conductors in the cable 26 to the downhole equipment. For ease of illustration, three separate 60 cycle per second inputs 30a, 30b, and 30c are shown in FIG. 5. As will be seen from the following description, the 60 cycle per second source provides operating power for the electronic equipment as well as providing a reference frequency for synchronizing the equipment.

Master timing pulses for synchronizing the various components of the system are generated by a pulse rate circuit 32. This circuit provides a train of sharp pulses whose frequency is an integral submultiple of the 60 cycle reference frequency. Thus, for example, the repetition frequency of the timing pulses generated by the pulse rate circuit 32 may vary from one-ninth to one-half of the 60 cycle reference frequency. Of course, other frequencies or ratios could be used if desired. Between each pair of successive pulses generated by the rate circuit 32, an individual measurement such as a transmitter-to-receiver travel time measurement or an acoustic impedance log measurement may be made. The pulse frequency selected will therefore depend on the particular type of formations expected to be encountered. A timing pulse rate that has been found suitable for a wide variety of applications is 20 pulses per second which provides a spacing between successive timing pulses of 50 milliseconds.

Timing pulses generated in the pulse rate circuit 32 are transmitted via a conductor 33 to a control signal generator 34. Between each successive pair of timing pulses from the rate circuit 32, the control signal generator 34 provides a control signal over conductor 38 in the cable 26 to the downhole equipment.

Electrical signals indicative of the acoustic measurements made by the downhole equipment are transmitted to the surface over conductor 40 in the cable 26. These signals are supplied to a detecting circuit 42, which produces an output which may be correlated with acoustic travel time measurements. Detecting circuit 42 additionally presents the acoustic waveform in a form suitable as an input to the acoustic impedance computer 44. Detecting circuit 42 is rendered responsive to electrical signals transmitted from the downhole equipment by timing pulses from the pulse rate circuit 32 transmitted via a fixed delay means 46. Delay means 46 is synchronized with the 60 second cycle reference frequency 30b and insures that the detecting circuit is not rendered operative until just prior to the expected arrival time of a signal from the downhole equipment. This minimizes the possibility of errors resulting from spurious signals.

The acoustic impedance computer 44 is conditioned for operation and synchronized by the 60 cycle reference source 30b. These synchronization pulses are utilized to start the operation of a computation sequence and to reset the computer for the next computation sequence at the end of a given sequence of computation.

Outputs from the acoustic impedance computer 44 are in the form of electrical signals which are supplied to an indicating means such as a recorder 52. As indicated by the dotted line, the record feeding means for the recorder is mechanically linked to the winch 28 for movement therewith whereby a plot of the acoustic impedance log verses depth in the well bore may be obtained.

Control signal pulses from the control signal generator 34 are conducted via conductor 38 in the cable 26 to operate the downhole equipment shown below the dashed line of FIG. 6, which are housed in the upper portion 20a of the logging tool 20. These control signals serve to actuate a transmitter channel means 58 which is synchronized by the 60 cycle reference frequency 30c. The transmitter channel means 58 performs a three-fold function. First, transmitter channel means 58 provides an output current pulse to activate the acoustic transmitter T for a firing operation. This generates acoustic energy for evaluating the acoustic impedance and for making travel time measurements between the transmitter T and the receiver R if so desired.

Transmitter channel means 58 also provides a blocking signal to deactivate a portion of the receiver channel means 60. The receiver channel means 60 may comprise a multistage amplifier provided with gating means to prevent an input signal to the first stage from reaching its output stage. The output of the transmitter channel means 58 supplies a blocking signal to the receiver channel means 60 which begins just prior to the generation of the transmitter fire pulse and continues to a time just prior to the earliest possible arrival of a signal from the receiver R. Thus, spurious signals or crosstalk can not be transmitted by the receiver channel means 60 to the surface equipment during this period. The input stage of the receiver channel means 60 is coupled to the receiver R by conductor 61.

The transmitter channel means 58 also generates a transmitter fire signal at the time the transmitter is fired. The transmitter fire signal is a narrow pulse indicating the time of firing of the downhole transmitter T. The fire signal pulse is coupled to the unblocked output stage of the receiver channel means 60 and is transmitted immediately to the surface on the conductor 40 indicating that the transmitter T has been fired at this time.

After the input stage of the receiver channel means 60 is unblocked, electrical signals resulting from the reflected acoustic energy sensed by the receiver R will be amplified and transmitted to the surface by the receiver channel means 60 over cable conductor 40. For each measurement then, there will be supplied to the surface equipment both a marking pulse indicative of the time of firing of the transmitter T and an electrical signal representative of the impinging acoustic energy at the receiver R. It will be understood, of course, that the receiver R in the logging tool converts the impinging acoustic energy into electrical signals having a waveform corresponding to such acoustic energy in a conventional manner. The receiver may be, for example, for this purpose, a pressure sensitive piezoelectric ceramic crystal constructed of a material such as barium titanate zirchonate or the like.

Details of the operation of circuits such as the pulse rate circuit 32, the control signal generator 34, delay means 46, the detector 42, transmitter channel means 58, receiver channel means 60 and the like may be obtained by reference to U.S. Pat. No. 3,304,537 which is assigned to the assignee of the present invention. The acoustic logging tool disclosed in this patent utilizes a plurality of axially spaced acoustic transmitters and receivers and may be employed for acoustic travel time logging of the type known as "borehole compensated". It will, of course, be appreciated by those skilled in the art that the methods and apparatus of the present invention may be utilized with such a tool as previously discussed.

Figure 6:
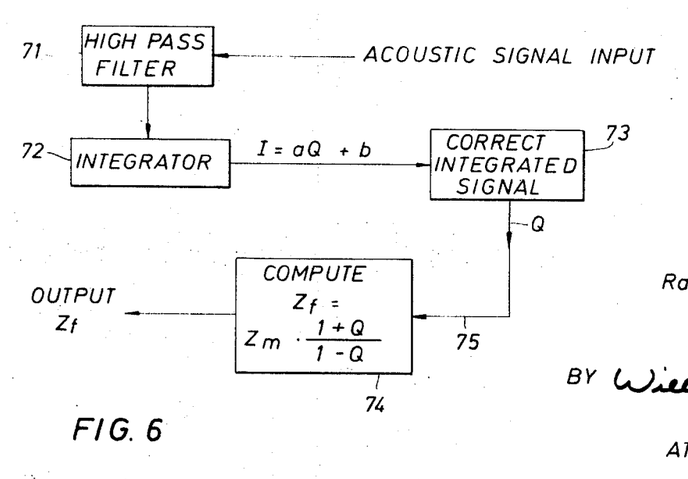
FIG. 6 is a block diagram showing the acoustic impedance computer of FIG. 5.

Referring now to FIG. 6, the operation of the acoustic impedance computer 44 of FIG. 5 is shown in more detail. The acoustic signal from the conductor 40 is input via the detector 42 to a high pass filter 71 which may be a conventional LC filter network or the like. The filter 71 is designed so as to pass only those frequencies which are above the 5 KHZ lower cutoff frequency discussed earlier. It will be recalled that in the frequency region above 5 KHZ the approximations regarding Equations (17), (18) and (19) are most valid. Thus, the portion of the acoustic signal above 5 KHZ is passed on to integrator 72. The integrator 72 effectively sums the various frequency components of the stress from the 5 KHZ lower bound to a predetermined upper cutoff frequency which may be chosen as desired. This signal is directly proportional to the acoustic reflection coefficient Q [recall Equation (20)]. A correction circuit 73 performs the division and subtraction indicated in Equation (20) to compute the value of the reflection coefficient Q according to that equation, the constants $a''$ and $b''$ being predetermined calibration constants for a particular tool. Thus, the output from the corrector circuit 73 is applied to the computation circuit 74 via conductor 75 and is directly proportional to the acoustic reflection coefficient Q.

Computation circuit 74 may be a conventional analog circuit comprised of appropriate adders and multipliers to perform the operations indicated by Equation (17) for the computation of $Z_f$, the formation impedance. In this computation the acoustic reflection coefficient Q is known having just been computed from the measured pressure at the acoustic transducer via Equation (20). The known mud acoustic impedance $Z_m$ may then be combined in the indicated manner to derive the acoustic impedance of the formation $Z_f$. $Z_f$ may then be recorded by the recorder 52 as a function of borehole depth.

It will, of course, be understood by those skilled in the art, that if desired, the data processing portion of the present invention may be performed at a remote site. For example, the acoustic waveforms from the downhole tool could be recorded either digitally or in analog form on magnetic tape and removed to a remotely located computer for further processing by a general purpose digital or special purpose digital or special purpose analog or digital computer. Such a computer could, utilizing Equations (17) and (20) with appropriate filtering and/or analog-to-digital converters, perform the process as described above. Alternatively, the data could be processed at the well site by a small portable digital computer if desired. In this case it would merely be necessary to convert the analog receiver output to digital form for processing.

In any case, the results of the analog or digital processing of the data from the downhole receiver will finally result in an output display relating to the acoustic impedance of the formation surrounding the borehole. If desired, an acoustic travel time log could be displayed or recorded simultaneously with this log together with other possible well logs of interest. Such a suite of logs can be combined using known well log interpretation schemes with the above data to yield other and further information about the formations surrounding the well bore than it has heretofore been possible to obtain.

While a particular embodiment of the present invention has been shown and described it is apparent that changes and modifications may be made without departing from the invention in its broader aspects. Therefore, the aim in the appended claims is to cover all such changes and modifications as fall within the true spirit and scope of the invention.

What is claimed is:

1. A method for determining the acoustic impedance of earth formations surrounding a drilling fluid-filled well borehole comprising the steps of:
    generating a signal representative of the acoustic reflection coefficient in the frequency region above a predetermined lower cutoff frequency;
    generating a signal representative of the acoustic impedance of the drilling fluid; and
    combining in a predetermined manner said acoustic reflection coefficient signal and said signal representative of the acoustic impedance of the drilling fluid to generate a signal representative of the acoustic impedance of earth formations surrounding the borehole.

2. The method of claim 1 wherein the step of generating a signal representative of the acoustic reflection coefficient in the frequency region above a predetermined lower cutoff frequency includes the steps of:
    transmitting a component of acoustic energy radially outwardly from a fluid-filled borehole into the surrounding earth formations;
    receiving a reflected portion of said transmitted energy and generating signals representative thereof; and
    integrating the portion of said received signal in the frequency region above said predetermined lower cutoff signal to generate a reflection coefficient signal.

3. The method of claim 2 and further including the step of linearly transforming said reflection coefficient signal in a predetermined manner to calibrate said reflection coefficient signal for a given well logging tool.

4. The method of claim 1 wherein the step of combining in a predetermined manner said reflection coefficient signal and said drilling fluid impedance signal includes multiplying said drilling fluid impedance signal by a predetermined function of said reflection coefficient signal.

5. The method of claim 4 wherein the combining step is performed by multiplying the drilling fluid impedance signal $Z_f$ by a signal representative of the ratio:
    $(1 + Q)/(1 - Q)$
    where Q is the magnitude of the signal representative of the reflection coefficient in the frequency region above a predetermined lower cutoff frequency.

6. The method of claim 1 wherein said predetermined lower cutoff frequency is approximately 5 KHZ.

7. The method of claim 1 wherein the steps are performed repetitively at different depths in the well borehole and said signal representative of the acoustic impedance of earth formations surrounding the borehole is recorded as a function of borehole depth.

8. A method for logging the acoustic impedance of earth formations surrounding a drilling fluid-filled well borehole comprising the steps of:
    transmitting a component of acoustic energy radially outwardly from the borehole into the surrounding earth formations;
    receiving a reflected portion of said transmitted energy and generating signals representative thereof;
    integrating the portion of said received signal in the frequency region above a predetermined lower cutoff frequency to generate a signal proportional to the acoustic reflection coefficient;
    linearly transforming said reflection coefficient signal in a predetermined manner to generate a calibrated acoustic reflection coefficient signal; and
    combining said calibrated acoustic reflection coefficient signal and a signal representative of the acoustic impedance of the drilling fluid in the borehole in a predetermined manner to generate a signal representative of the acoustic impedance of the earth formations surrounding the borehole.

9. The method of claim 8 wherein the steps are performed repetitively at different borehole depths and the signals representative of the acoustic impedance are recorded as a function of borehole depth.

10. The method of claim 8 wherein said predetermined lower cutoff frequency is approximately 5 KHZ.

11. The method of claim 8 wherein said combining step is performed by multiplying said signal representative of the acoustic impedance of the drilling fluid in the borehole $Z_f$ by a signal representative of the ratio:

$(1 + Q)/(1 - Q)$ where Q is the magnitude of the signal representative of the calibrated acoustic reflection coefficient to generate a signal representative of the acoustic impedance of earth formations surrounding the borehole.

12. Apparatus for determining the acoustic impedance of earth formations surrounding a fluid-filled well borehole comprising:
 a body member sized for passage through a well bore;
 acoustic transmitting means carried by said body member for transmitting a component of acoustic energy radially outwardly from the borehole into the surrounding earth formation;
 receiving means for receiving a reflected portion of said transmitted energy and generating signals representative thereof;
 means for integrating the portion of said received signal in the frequency region above a predetermined lower cutoff frequency to generate a signal proportional to the acoustic reflection coefficient;
 means for linearly transforming said reflection coefficient signal in a predetermined manner to generate a calibrated reflection coefficient signal; and
 means for combining said calibrated reflection coefficient signal and a signal representative of the acoustic impedance of the drilling fluid in a predetermined manner to generate a signal representative of the acoustic impedance of the earth formation surrounding the borehole.

13. The apparatus of claim 12 and further including:
 means for moving said body member through the borehole;
 means for repetitively actuating said transmitter means and said receiver means at different borehole depths; and
 means for recording said signal representative of the acoustic impedance of earth formations surrounding the borehole as a function of the depth of said body member in the borehole.

14. The apparatus of claim 12 wherein said means for integrating the received signal in the frequency region above a predetermined lower cutoff frequency includes filter means for passing substantially only the frequency components of the received signal above the lower cutoff frequency and integrator means coupled to the output of said filter means.

15. The apparatus of claim 14 wherein said filter means passes substantially only frequencies above 5 KHZ.

16. The apparatus of claim 12 wherein the means for combining said calibrated reflection coefficient signal and a signal representative of the acoustic impedance of the drilling fluid includes means for generating a signal representative of the quantity:

$(1 + Q)/(1 - Q)$ where Q is the magnitude of the signal representative of the calibrated reflection coefficient, together with means for multiplying this latter signal by said signal representative of the acoustic impedance of the drilling fluid.

* * * * *

UNITED STATES PATENT OFFICE
CERTIFICATE OF CORRECTION

Patent No. 3,739,328                     Dated June 12, 1973

Inventor(s) Ralph G. Beil

It is certified that error appears in the above-identified patent and that said Letters Patent are hereby corrected as shown below:

<u>IN THE CLAIMS</u>

Column 13, Claim 12 -

>line <u>25</u>, "and" should be deleted;

>after line <u>25</u>, --means for producing a representation of the acoustic impedance of the drilling fluid; and-- should be inserted;

>line <u>26</u>, "a signal representative" should read --said representation--;

Column 14, Claim 16 -

>line <u>23</u>, "a signal representative" should read --said representation--;

>lines <u>29 and 30</u>, "signal representative" should read --representation--.

Signed and sealed this 5th day of March 1974.

(SEAL)
Attest:

EDWARD M. FLETCHER, JR.
Attesting Officer

C. MARSHALL DANN
Commissioner of Patents